(12) United States Patent
Schneider et al.

(10) Patent No.: US 7,552,354 B2
(45) Date of Patent: Jun. 23, 2009

(54) METHOD OF PROTECTING A MICROCOMPUTER SYSTEM AGAINST MANIPULATION OF DATA STORED IN A MEMORY ARRANGEMENT

(75) Inventors: Klaus Schneider, Ludwigsburg (DE); Matthias Knauss, Schorndorf (DE); Peter Poinstingl, Zwettl (AT)

(73) Assignee: Robert Bosch GmbH, Stuttgart (DE)

( * ) Notice: Subject to any disclaimer, the term of this patent is extended or adjusted under 35 U.S.C. 154(b) by 826 days.

(21) Appl. No.: 10/188,167

(22) Filed: Jul. 1, 2002

(65) Prior Publication Data

US 2003/0065968 A1 Apr. 3, 2003

(30) Foreign Application Priority Data

Jul. 2, 2001 (DE) ................. 101 31 300

(51) Int. Cl.
*H04L 1/22* (2006.01)
(52) U.S. Cl. ............... 714/1; 714/42; 714/47; 713/2; 713/193; 380/2
(58) Field of Classification Search .......... 714/1
See application file for complete search history.

(56) References Cited

U.S. PATENT DOCUMENTS

| | | | |
|---|---|---|---|
| 4,819,237 A * | 4/1989 | Hamilton et al. ........ 714/22 |
| 5,442,645 A | 8/1995 | Ugon et al. | |
| 5,533,123 A * | 7/1996 | Force et al. ........ 713/189 |
| 5,712,968 A * | 1/1998 | Nakayama et al. ........ 714/4 |
| 5,712,969 A * | 1/1998 | Zimmermann et al. ........ 714/5 |
| 5,740,178 A * | 4/1998 | Jacks et al. ........ 714/722 |

(Continued)

FOREIGN PATENT DOCUMENTS

DE 197 23 332 9/1998

(Continued)

OTHER PUBLICATIONS

Rolina, T., 'Past, Present, and Future of Real-Time Embedded Automotive Software: A Close look at basic concepts of AUTOSAR', SAE international, 2005, entire document, http://www.etas.com/data/presentations/SAE2006_AUTOSAR_Rolina_2006-04-05.pdf.*

(Continued)

*Primary Examiner*—Kambiz Zand
*Assistant Examiner*—Ronald Baum
(74) *Attorney, Agent, or Firm*—Kenyon & Kenyon LLP

(57) ABSTRACT

A method of protecting a microcomputer system against manipulation of data stored in a memory arrangement of the microcomputer system, in particular a control program stored there. Checking mechanisms are executed at preselectable points in times to check for manipulation of the data. To permit effective blocking of manipulated data stored in the memory arrangement, new data is stored at least partially in a volatile memory, in particular in a random access memory, in reprogramming or new programming of the memory arrangement, the checking mechanisms are executed and the portion of the new data stored in the volatile memory is copied to the memory arrangement if no manipulation of the new data has been detected.

19 Claims, 2 Drawing Sheets

U.S. PATENT DOCUMENTS

| | | | | |
|---|---|---|---|---|
| 5,801,621 A * | 9/1998 | Issa et al. | | 340/439 |
| 5,940,850 A * | 8/1999 | Harish et al. | | 711/102 |
| 5,964,813 A * | 10/1999 | Ishii et al. | | 701/35 |
| 6,167,338 A * | 12/2000 | De Wille et al. | | 701/51 |
| 6,181,598 B1 * | 1/2001 | Matsubara et al. | | 365/185.11 |
| 6,249,848 B1 * | 6/2001 | Terada et al. | | 711/154 |
| 6,804,752 B2 * | 10/2004 | Patterson et al. | | 711/163 |
| 6,941,219 B2 * | 9/2005 | Avery et al. | | 701/115 |

FOREIGN PATENT DOCUMENTS

| | | |
|---|---|---|
| JP | 8030450 | 2/1996 |
| WO | WO 9015384 | 12/1990 |

OTHER PUBLICATIONS

Sundaram, P., et al, 'Controller Integrity in Automotive Failsafe System Architectures', SAE International, 2006, entire document, http://delphi.com/pdf/techpapers/2006-01-0840.pdf.*

* cited by examiner

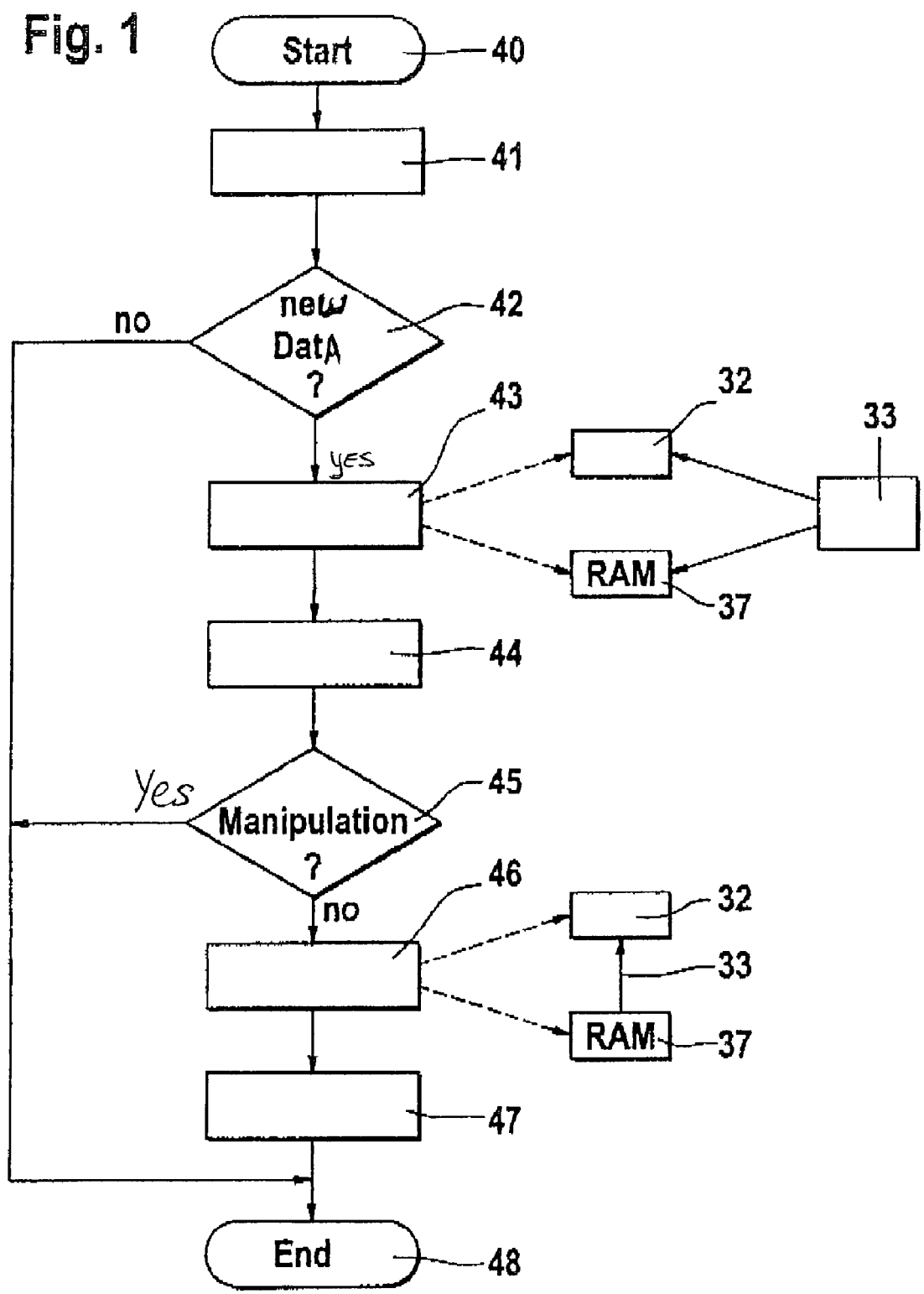

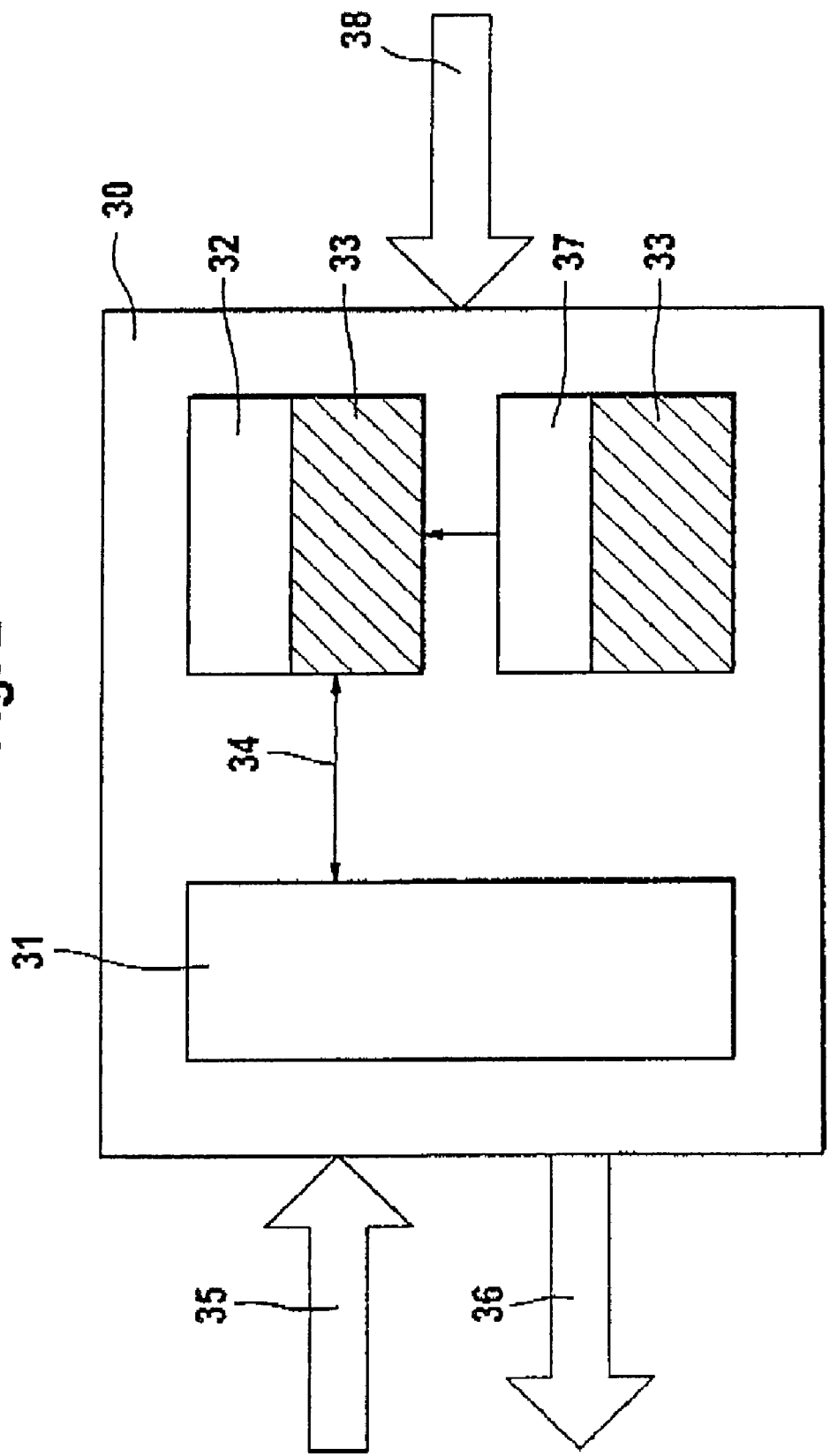

METHOD OF PROTECTING A MICROCOMPUTER SYSTEM AGAINST MANIPULATION OF DATA STORED IN A MEMORY ARRANGEMENT

FIELD OF THE INVENTION

The present invention relates to a method of protecting a microcomputer system against manipulation of data stored in a memory arrangement of the microcomputer system. The data is in particular a control program stored in the microcomputer system. Checking mechanisms are executed at preselectable points in time to check for manipulation of the data.

The present invention also relates to a microcomputer system including a computer, in particular a microprocessor, including a memory arrangement in which data, in particular a control program, may be stored, and including checking mechanisms executable at preselectable points in times to check for manipulation of data.

BACKGROUND INFORMATION

There are methods of protecting data stored in a memory arrangement of a microcomputer system in other systems, in particular for protecting a control program stored there against manipulation. Such a method is referred to in, for example, German Published Patent Application No. 197 23 332. Such methods are, for example, used to prevent unauthorized manipulation of a control program stored in a control device of a motor vehicle or parameters or limiting values stored from this program. The control program controls or regulates specific functions in the motor vehicle, for example an internal combustion engine, a driving dynamics regulator, a stop control system (SCS) or an electronic steering system (steer-by-wire). A defect in the controlled or regulated unit of the motor vehicle may occur due to a manipulation of the control program. Therefore, manipulation of the control program or the data is to be prevented.

In spite of any risks of manipulation of the control program or the data by unauthorized persons, it may not be advisable to forbid access to the memory arrangement of the control device completely. In order to, for example, perform reprogramming of the control device, an authorized user group should be able to access the memory arrangement. Specifically, it may be necessary from time to time to store a new version of a control program or new parameters or limiting values in the control device in order to, for example, remove errors in the software or to take new legal requirements into account.

In automotive control devices, a distinction may be made between serial equipment and application equipment. Control devices are usually shipped as serial equipment after manufacturing. In serial equipment, checking mechanisms (for example, formation of a checksum) for checking for manipulation of data stored in a memory arrangement of the control device are activated. Manipulated data may be detected by these mechanisms and such data may be blocked. The checking mechanisms may be referred to in various exemplary embodiments from other prior systems.

In certain situations, in particular during the development and testing phase of control devices, it may be necessary to deactivate the checking mechanisms so that various data may be stored in the memory arrangement rapidly and easily. A control device including deactivated checking mechanisms may be referred to as an application device.

To be able to ensure complete test coverage of data stored in the memory arrangement, the same data, in particular the same control program, is stored in the memory arrangement of the control device in both the series case and the application case. Therefore, a control device is able to be switched from a series case to an application case without having to load other data into the memory arrangement. Switching from the application case back to the series case may not be desirable and may even be impossible in order to prevent control devices, whose control program has not been tested and approved by the manufacturer of the control device, from being in circulation.

According to other systems, an identifier (marker) may be defined for blocking manipulated data. This marker is a storage area in a nonvolatile memory of the microcomputer system which is used to identify a block (code area or data area) as logically valid or invalid. A test pattern may be programmed in this storage area to set the marker as valid or invalid. The marker is used to store the result of the manipulation check. This may save time in a subsequent check for manipulation, because it is no longer necessary to perform a complete check of the memory arrangement, and instead only the marker need be analyzed.

The marker is defined as invalid at the beginning of the reprogramming or new programming. Then the memory arrangement is reprogrammed or programmed anew and next the new data is checked by the checking mechanisms for manipulation. If the check of the memory arrangement is in order, the marker is set at logically valid. Otherwise, the marker is not programmed and it remains logically invalid.

In powering up the microcomputer system, a check is performed to determine whether the marker has been set (logically valid). If so, the check has been conducted successfully and the data may be used entirely normally. However, if the marker has not been set (logically invalid), either the check has failed or it has been interrupted due to an interruption in power supply (power down), for example.

The marker is located in a storage area which is inaccessible from the outside and yet accessible to modification (set at valid or invalid). These conditions are met when the marker is stored in the storage area of the memory arrangement in which the data is also stored or in which new data is stored in a reprogramming or new programming. There is the risk that the marker might also be programmed and set at valid during the reprogramming or new programming using manipulated data and then the control device might be shut down after the reprogramming or new programming to prevent execution of the checking mechanisms following the reprogramming or new programming. The next time the computer is powered up, the marker has the value valid and the newly programmed data may be used entirely normally, although it is manipulated data.

SUMMARY OF THE INVENTION

Therefore, it is an object of exemplary embodiment and/or exemplary method of the present invention to permit effective blocking of data in a memory arrangement of a microcomputer system if the data has been manipulated.

The exemplary embodiment and/or exemplary method of the present invention provides that new data be stored at least partially in a volatile memory, in particular in a random access memory (RAM), in reprogramming or new programming of the memory arrangement, that the checking mechanisms be executed and the portion of the new data stored in the volatile memory be copied to the memory arrangement if no manipulation of the new data has been detected.

According to the exemplary embodiment and/or exemplary method of the present invention, at first in reprogramming or new programming, not all the new data is transferred to the memory arrangement actually provided for it, and instead a portion of the data is copied to a volatile memory which loses its data when the power supply is interrupted. Only after successful execution of checking mechanisms without detecting manipulation of the data is the remaining new data copied from the volatile memory to the memory arrangement.

If manipulation of the data is detected, the remaining data is not copied from the volatile memory to the memory arrangement. If the power supply is interrupted during or after execution of the checking mechanisms (power down), the data stored in the volatile memory is lost and is not copied to the memory arrangement. In both cases, the data stored in the memory arrangement is incomplete and may not be used or executed. The exemplary method according to the present invention permits a reliable and hardly overridable blockade of manipulated data in the memory arrangement of a microcomputer system. Execution of a manipulated control program or use of manipulated data is effectively preventable. It is believed that this method should be completely independent of external influences such as an interruption in power supply (power down).

The checking mechanisms are capable of checking the total content of the memory arrangement or only a portion of the data stored there for manipulation. According to an exemplary embodiment of the present invention, the checking mechanisms check the content of the volatile memory for manipulation.

The choice of the portion of the data to be stored in the volatile memory in reprogramming or new programming may be made on the basis of a defined algorithm, for example. The portion of the data to be checked for manipulation may also be determined through the choice of the portion of data stored in the volatile memory. According to an exemplary embodiment of the present invention, however, the portion of data stored in the volatile memory in reprogramming or new programming of the memory arrangement is selected randomly.

Since generating a random number is not trivial in many microcomputer systems, various manners for generating a random number are described. Firstly, a noise signal may be read at an analog/digital (A/D) input of the microcomputer system and a random number may be generated as a function of the noise signal. The A/D input supplies a random noise signal when it is unpowered. Secondly, a sum of the contents of the memory arrangement may be formed and a random number may be generated as a function of this sum. The contents of the memory arrangement are disordered, or in other words, they are randomly ordered before powering up the microcomputer system. In addition, a timer inside the computer which is not reset in powering up the microcomputer system may be read out and a random number may be generated as a function of the status of the timer. Finally, a variable influenceable by a driver of a vehicle in which the microcomputer system is installed may be used and a random number may be generated as a function of this variable. As a variable influenceable by the driver, the position of an accelerator pedal or a variable of an adaptive driver's characteristics map may be used, for example.

Also, the microcomputer system may include a volatile memory in which at least a portion of the new data is storable in reprogramming or new programming of the memory arrangement and may include an arrangement for copying the portion of the new data stored in the volatile memory to the memory arrangement if checking mechanisms executed previously have shown that the new data has not been manipulated. The volatile memory may be a random access memory (RAM).

According to an exemplary embodiment of the present invention, the microcomputer system may be configured as a control device for a motor vehicle for controlling and/or regulating automotive functions.

According to an exemplary embodiment of the present invention, the microcomputer system includes an arrangement for execution of the exemplary method according to the present invention. A computer program that is capable of executing on the computer and is suitable for execution of the exemplary method according to the present invention is stored in the memory arrangement.

The memory arrangement may be configured on the same semiconductor component as the computer. In the case of such on-chip storage, the program memory, i.e., the data stored in it, is not accessible to external manipulation, thus providing additional protection of the microcomputer system against manipulation of the data stored in the memory arrangement.

BRIEF DESCRIPTION OF THE DRAWINGS

FIG. 1 shows a flow chart of an exemplary method according to the present invention.

FIG. 2 shows an exemplary microcomputer system according to the present invention.

DETAILED DESCRIPTION

FIG. 1 shows a flow chart of an exemplary method according to the present invention for protection of a microcomputer system 30 from FIG. 2 against manipulation of data 33 stored in a memory arrangement 32 of microcomputer system 30. Microcomputer system 30 is configured, e.g., as a control device in a motor vehicle for controlling and/or regulating certain automotive functions. Data 33 is embodied as a control program, as limiting values or as parameters, for example.

Control device 30 includes a microprocessor 31 for processing a control program 33 stored in memory arrangement 32 and/or for processing data 33 stored there. To transmit data 33 from memory arrangement 32 to microprocessor 31, a data transmission link 34 is provided between the processor and the memory. Data 33 is transmitted to microprocessor 31 incrementally or as a whole for processing. Results of calculations and the like are transmitted from microprocessor 31 to memory arrangement 32. Memory arrangement 32 is configured on the same semiconductor component as microprocessor 31 (on-chip storage). Sensor signals 35 from various sensors for detecting the status of the vehicle are sent to control device 30. Control device 30 determines output signals 36 for actuators for influencing the status of the vehicle from sensor signals 35 and as a function of data 33 (control program, parameters and/or limiting values).

From time to time, it may be necessary to program anew or reprogram control device 30, i.e., data 33 stored in the memory arrangement. Reprogramming or new programming may be necessary to store a new version of a control program or new parameters or limiting values in control device 30 in order, for example, to remove errors in the software or to take new legal requirements into account. For reprogramming or new programming, memory arrangement 32 is first erased and then new data 33 is written to it. An arrow 38 illustrates the transfer of new data 33 from a programming device to control device 30. Before new data 33 may be used, it is checked to determine whether it is manipulated data. This is done by execution of suitable checking mechanisms, e.g., forming a checksum, at preselectable times. Such checking mechanisms are referred to in other prior systems and will not be discussed in detail here.

The exemplary method according to the present invention as illustrated in FIG. 1 begins in a function block 40. In a function block 41, microcomputer system 30 is powered up, for example, by turning an ignition key in a motor vehicle in which microprocessor system 30 is installed as a control device or by pressing a starter button. In a query block 42, a check is performed to determine whether new data 33 for reprogramming or new reprogramming memory arrangement 32 has been applied. If not, the sequence branches off to a function block 48, the exemplary method according to the present invention is terminated and powering up of microcomputer system 30 may be continued entirely normally and microcomputer system 30 may be operated entirely normally.

However, if data 33 for new programming or reprogramming of memory arrangement 32 has been applied, new data 33 is transmitted in a function block 43 to control device 30, where a portion of the data is stored in memory arrangement 32 and a portion is stored in a volatile memory (e.g., a random access memory, RAM) 37 of microcomputer system 30. Data 33 stored in volatile memory 37 is lost when the power supply is interrupted. In a function block 44, data 33 stored in volatile memory 37 is checked for manipulation on the basis of checking mechanisms (e.g., forming a checksum) referred to in other prior systems. In a query block 45, a query determines whether or not checked data 33 has been manipulated. If this is the case, the sequence branches off to function block 48 and the exemplary method according to the present invention is terminated. This means that a portion of data 33 is still stored in volatile memory 37 just as before, and not in memory arrangement 32 which is actually provided for it. As soon as the power supply is interrupted, this data 33 is lost. Thus data 33 stored in memory arrangement 32 is not complete; a new control program would not be executable or not without errors, and new parameters or limiting values would be defective or incomplete. The exemplary method according to the present invention thus permits effective blocking of data 33 for the case when manipulation of data 33 has been detected.

If no manipulation of data 33 has been detected, the remaining data 33 is copied from volatile memory 37 to memory arrangement 32 in a function block 46. The data stored in memory arrangement 32 is then complete; a control program may be executed normally, parameters or limiting values are fully usable. The exemplary method according to the present invention is terminated in function block 48. Powering up of microcomputer system 30 is continued entirely normally and microcomputer system 30 is then operated entirely normally.

What is claimed is:

1. A method of protecting a microcomputer system against manipulation involving an undesired modification of data stored in a non-volatile memory arrangement of the microcomputer system, the method comprising:
   storing new data at least partially in a volatile memory when one of reprogramming and newly programming the memory arrangement, wherein during the storing, a portion of the new data stored in the volatile memory is not stored in the memory arrangement;
   executing at least one check mechanism at at least one preselectable point in time to check for manipulation of the portion of the new data stored in the volatile memory; and
   copying the portion of the new data stored in the volatile memory to the memory arrangement if no manipulation involving an undesired modification of the portion of the new data stored in the volatile memory has been detected during the executing of the at least one check mechanism.

2. The method of claim 1, wherein the data stored in the memory arrangement includes a control program.

3. The method of claim 1, wherein the volatile memory includes a random access memory.

4. The method of claim 1, wherein the at least one check mechanism is operable to check a content of the volatile memory for manipulation anytime prior to a loss of the volatile memory's ability to store the portion of the new data.

5. The method of claim 1, wherein the portion of the new data stored in the volatile memory, when one of reprogramming and newly programming the memory arrangement, is selected randomly.

6. A microcomputer system comprising:
   a computer;
   a non-volatile memory arrangement to store data;
   a volatile memory to store a portion of new data during one of reprogramming and newly programming the memory arrangement, wherein when the portion of the new data is stored to the volatile memory, the portion of the new data is not stored in the memory arrangement;
   at least one checking mechanism executable at at least one preselectable point in time to check for manipulation involving an undesired modification of the portion of the new data stored in the volatile memory; and
   a copying arrangement to copy the portion of the new data stored in the volatile memory to the memory arrangement if the at least one checking mechanism executed previously indicates that the portion of the new data stored in the volatile memory has not been manipulated as to an undesired modification.

7. The microcomputer system of claim 6, wherein the computer includes a microprocessor.

8. The microcomputer system of claim 6, wherein the volatile memory includes a random access memory.

9. The microcomputer system of claim 6, wherein the data includes a control program.

10. The microcomputer system of claim 6, wherein the microcomputer system is configured as a control device for a motor vehicle for at least one of a controlling automotive function and a regulating automotive functions.

11. The microcomputer system of claim 6, wherein the at least one check mechanism is operable to check a content of the volatile memory for manipulation anytime prior to a loss of the volatile memory's ability to store the portion of the new data.

12. The microcomputer system of claim 6, wherein the portion of the new data stored in the volatile memory, when one of reprogramming and newly programming the memory arrangement, is selected randomly.

13. The microcomputer system of claim 6, wherein the microcomputer system includes a computer program storable at the memory arrangement and executable by the computer, the computer program comprising program code for protecting the microcomputer system against manipulation of data stored in the memory arrangement of the microcomputer system by performing the steps of:
   storing new data at least partially in the volatile memory when one of reprogramming and newly programming the memory arrangement, wherein during the storing, a portion of the new data stored in the volatile memory is not stored in the memory arrangement;

executing at least one check mechanism at at least one preselectable point in time to check for manipulation of the portion of the new data; and copying the portion of the new data stored in the volatile memory to the memory arrangement if no manipulation of the portion of the new data stored in the volatile memory has been detected during the executing of the at least one check mechanism.

14. The microcomputer system of claim 6, wherein the memory arrangement is configured on a same semiconductor component as the computer.

15. A computer program storable at a memory and executable by a computer, the computer program comprising program code for protecting a microcomputer system against manipulation involving an undesired modification of data stored in a non-volatile memory arrangement of the microcomputer system by performing the steps of:

storing new data at least partially in a volatile memory when one of reprogramming and newly programming the memory arrangement, wherein during the storing, a portion of the new data stored in the volatile memory is not stored in the memory arrangement;

executing at least one check mechanism at at least one preselectable point in time to check for manipulation of the portion of the new data stored in the volatile memory; and copying the portion of the new data stored in the volatile memory to the memory arrangement if no manipulation involving an undesired modification of the portion of the new data stored in the volatile memory has been detected during the executing of the at least one check mechanism.

16. The computer program of claim 15, wherein the data stored in the memory arrangement includes a control program.

17. The computer program of claim 15, wherein the volatile memory includes a random access memory.

18. The computer program of claim 15, wherein the at least one check mechanism is operable to check a content of the volatile memory for manipulation anytime prior to a loss of the volatile memory's ability to store the portion of the new data.

19. The computer program of claim 15, wherein the portion of the new data stored in the volatile memory, when one of reprogramming and newly programming the memory arrangement, is selected randomly.

* * * * *